United States Patent [19]
Kurosawa

[11] Patent Number: 5,596,905
[45] Date of Patent: Jan. 28, 1997

[54] OSCILLATION DAMPING GEAR

[75] Inventor: Yuichi Kurosawa, Tokyo, Japan

[73] Assignee: Asahi Kogaku Kogyo Kabushiki Kaisha, Tokyo, Japan

[21] Appl. No.: 374,978

[22] Filed: Jan. 19, 1995

[30] Foreign Application Priority Data

Jan. 21, 1994 [JP] Japan .................................. 6-005335
Jan. 21, 1994 [JP] Japan .................................. 6-005336

[51] Int. Cl.$^6$ ............................ F16H 55/17; G03B 1/12
[52] U.S. Cl. ....................................... 74/443; 74/461
[58] Field of Search .................................. 74/443, 461

[56]  References Cited

U.S. PATENT DOCUMENTS

| | | | |
|---|---|---|---|
| 1,772,986 | 8/1930 | Dunham | 74/461 |
| 3,304,795 | 2/1967 | Rouverol | 74/443 |
| 3,329,037 | 7/1967 | Stott | 74/443 |
| 4,184,380 | 1/1980 | Rivin | 74/461 |
| 4,944,196 | 7/1990 | Rivin | 74/461 |
| 4,954,859 | 9/1990 | Kitazawa . | |
| 5,341,187 | 8/1994 | Kurei . | |

FOREIGN PATENT DOCUMENTS

| | | | |
|---|---|---|---|
| 5083071 | 1/1977 | Japan | 74/443 |
| 1237844 | 8/1986 | U.S.S.R. | 74/443 |

*Primary Examiner*—Vinh T. Luong
*Assistant Examiner*—David Fenstermacher
*Attorney, Agent, or Firm*—Greenblum & Bernstein P.L.C.

[57]    ABSTRACT

An oscillation damping gear including a gear member generally in the form of a chrysanthemum, having teeth and radial grooves defined between and by adjacent teeth, and an oscillation damping member having oscillation damping elements fitted in the radial grooves of the gear member. The oscillation damping member may include a plurality of separate damping elements or a central annular portion with a plurality of legs radially extending from the center annular portion. The separate damping elements or the plurality of legs are snugly fitted into the radial grooves of the gear member. The oscillation damping member may also include two adjacent gear members that are superimposed, so as to create a phase difference between the teeth, and coupled through a damping plate. The damping plate is elastically deformable such that the adjacent gears may rotate relative to each other.

10 Claims, 11 Drawing Sheets

OSCILLATION DAMPING GEAR

BACKGROUND OF THE INVENTION

1. Field of the Invention

The present invention relates to an oscillation damping gear.

2. Description of the Related Art

In a conventional gear arrangement, there is a backlash between a pair of gears which are in mesh with each other. The gears oscillate during rotation due to this backlash, generating noise.

In general, a gear train is incorporated in a camera to transmit the rotation of a driving motor to a spool or a rewinding fork. There is a predetermined backlash set between the gears of the gear train. Consequently, in a conventional camera having a gear train incorporated therein, a considerable sound i.e., noise is produced by the gear train during the operation of the gear train, i.e., during the winding and rewinding operations of the film. The sound is not acceptable, particularly when the photographing is carried out in a silent place. To solve this, it is possible to use an endless belt in place of the gear train. However, the endless belt increases the thickness of a rotation transmission mechanism associated with the gear train, and is therefore contrary to a realization of a compact camera.

SUMMARY OF THE INVENTION

The primary object of the present invention is to provide an oscillation damping gear in which there is no or little noise produced during the rotation of the gear in mesh with another gear.

Another object of the present invention is to provide a gear train for a camera in which there is no or little noise produced during the film winding and rewinding operations.

To achieve the object mentioned above, according to the present invention, there is provided an oscillation damping gear including a gear member, generally in the form of a chrysanthemum, having teeth and radial grooves defined between and by the adjacent teeth, and an oscillation damping member having oscillation damping elements that are fitted in the respective radial grooves of the gear member.

The oscillation damping member may include a plurality of separate and independent identical damping elements that are snugly fitted in the radial grooves of the gear member.

Alternatively, the oscillation damping member may include a central annular portion, and a plurality of radial legs extending from the central annular portion in the radial directions thereof, the radial legs being fitted in the corresponding radial grooves of the gear member.

According to another aspect of the present invention, there is provided a gear train including at least one pair of first and second oscillation damping gears meshing with each other, each including a gear member generally in the form of a chrysanthemum having teeth and radial grooves defined between and by the adjacent teeth, and an oscillation damping member having oscillation damping elements that are fitted in the respective radial grooves of the gear member.

With this arrangement, there is no or little noise when the gear is in mesh with a mating gear owing to the elastic deformation of the damping elements fitted in the radial grooves of the gear member. The absence of an endless belt contributes to a reduction of the thickness of the power transmission mechanism. Moreover, when the damping gear is applied to a film winding and rewinding mechanism for a camera, the noise produced during the film winding and rewinding operations can be reduced.

Preferably, the oscillation damping gears satisfy the following relationship:

$$L \leq r1 + r2,$$

wherein "r1" designates the pitch radius of the first damping gear, "r2" the pitch radius of the second damping gear, "L" the distance between the axes of the first and second damping gears.

More preferably, the oscillation damping gears satisfy the following relationship:

$$L < r1 + r2,$$

According to another aspect of the present invention, there is provided an oscillation gear including at least one pair of identical first and second planar gears and one damping plate provided and secured between the planar gears, the damping plate being elastically deformable, and the planar gears being superimposed through the damping plate so that there is a predetermined amount of phase difference between the teeth of the first and second planar gears in the circumferential direction thereof.

According to still another aspect of the present invention, a gear train for a camera is provided having a driving motor, a spool and a film rewinding fork, rotation of the driving motor transmitted to at least one of the spool and the film rewinding fork through the gear train. At least one gear of the gear train includes at least one pair of identical first and second planar gears and one damping plate provided and secured between the planar gears, the damping plate being elastically deformable, and the planar gears being superimposed through the damping plate so that there is a predetermined amount of phase difference between the teeth of the first and second planar gears in the circumferential direction thereof.

An oscillation damping gear may include more than two gear members and more than one damping plate provided between the adjacent gear members. Gear members are superimposed through the damping plates, so that there is a phase difference between the teeth of adjacent gear members.

With this arrangement, there is no or little noise when the gear is in mesh with a mating gear, owing to the elastic deformation of the damping members between the adjacent gear members. The absence of an endless belt contributes to a reduction of the thickness of the power transmission mechanism. Moreover, when the damping gear is applied to a film winding and rewinding mechanism for a camera, the noise produced during the film winding and rewinding operations can be reduced.

The present disclosure relates to subject matter contained in Japanese patent application Nos. 6-5335 and 6-5336 (both filed on Jan. 21, 1994) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 11:
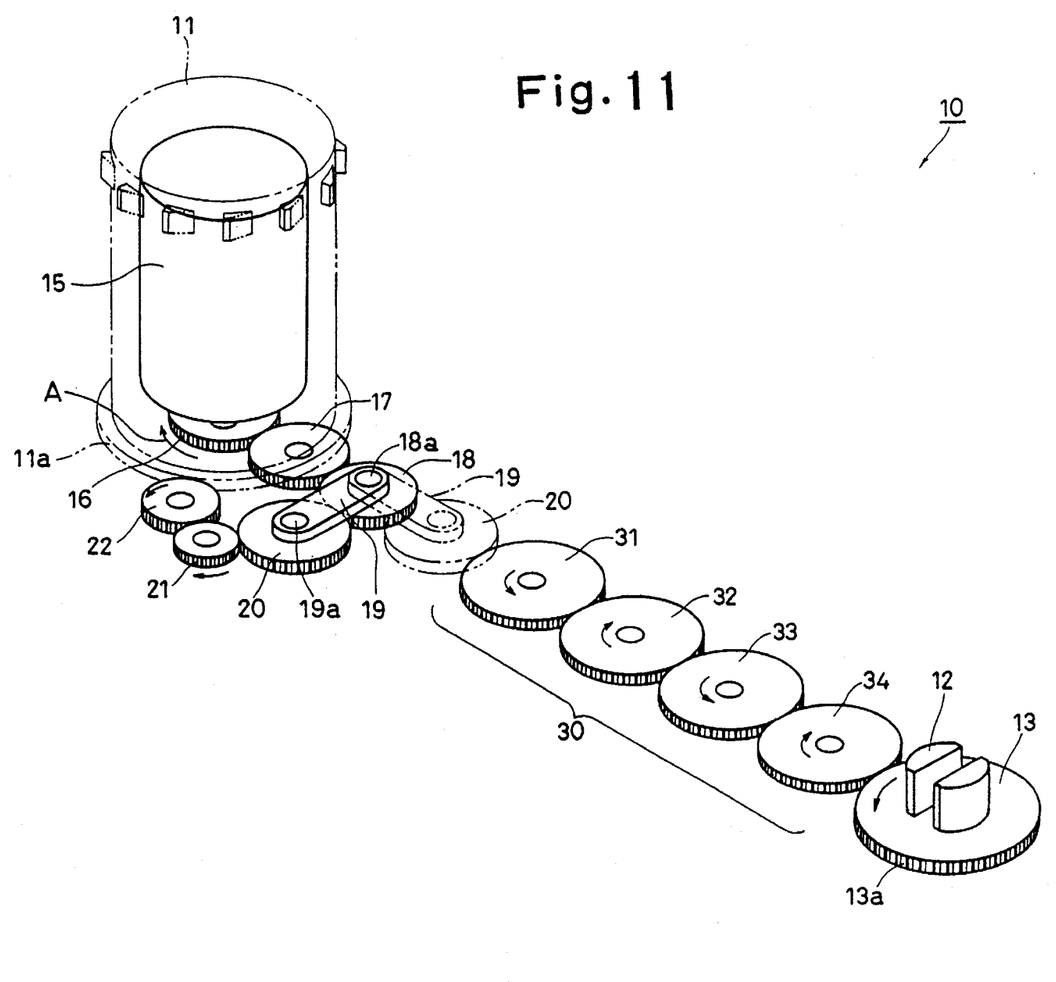

With reference to FIG. 11, which shows a film winding and rewinding mechanism of a camera to which the present invention is applied, a film winding spool 11, in the form of a hollow cylinder, and a rotating member 13, provided, on the central portion of an upper surface thereof, with a film rewinding fork 12, are provided in a spool compartment (not shown) and a patrone (cassette) compartment (not shown), respectively.

A DC motor 15 is provided in the film winding spool 11 and secured to a camera body. The DC motor 15 has at one end thereof a driving shaft to which a pinion 16 is secured. The pinion 16 is engaged with an adjacent gear 17 which is in turn mesh with a gear 18.

The gear 18 engages with a clutch gear 20 which is pivoted to a shaft 19a at one end of a clutch lever 19 and pivoted at the other end to a shaft 18a of the gear 18. The clutch lever 19 comes into frictional contact with the gear 18, so that the clutch lever 19 swings in the same direction as the rotation of the gear 18. Consequently, the clutch lever 19 swings in accordance with the direction of the rotation of the gear 18 to move the clutch gear 20 between a first position, indicated by a solid line, and a second position, indicated by a phantom line in FIG. 11. The clutch gear 20 engages with a gear 21 at the first position (solid line), which is in mesh with an adjacent gear 22 which is in turn mesh with a gear 11a formed at the lower end of the spool 11.

The clutch gear 20 engages, at the second position (phantom line), with a gear 31 of a gear train 30 constituted by gears 31 through 34. The terminal gear 34 of the gear train 30 is in mesh with a gear portion 13a formed on the outer peripheral surface of the rotating member 13.

In FIGS. 1 through 5 which show a first aspect of an oscillation damping gear G1 according to the present invention, the damping gear G1 is applied to any of the gears 17, 18, 20, 21, 22, or 31 through 34, of the film winding and rewinding mechanism 10 mentioned above.

Figure 1:
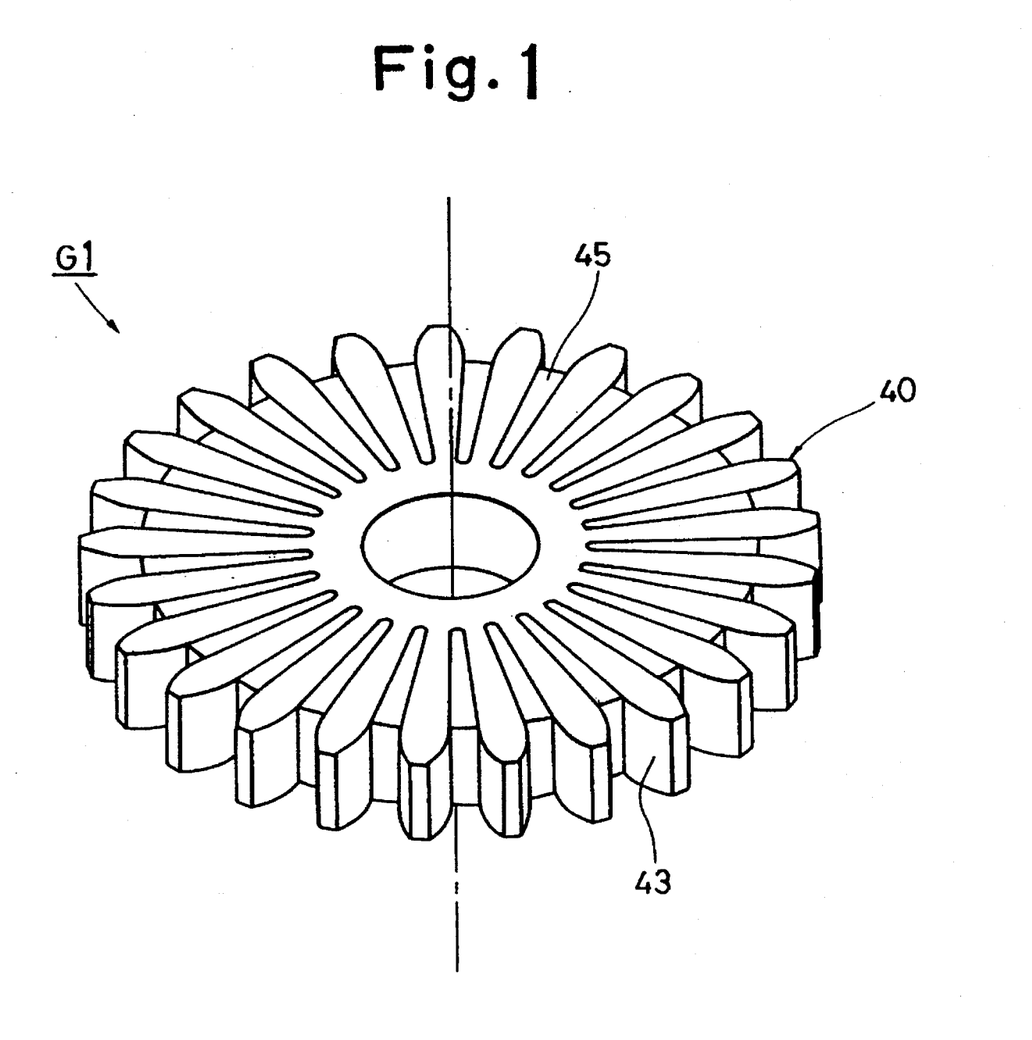
FIG. 1 is a perspective view of an oscillation damping gear according to a first embodiment of the present invention.
Figure 2:
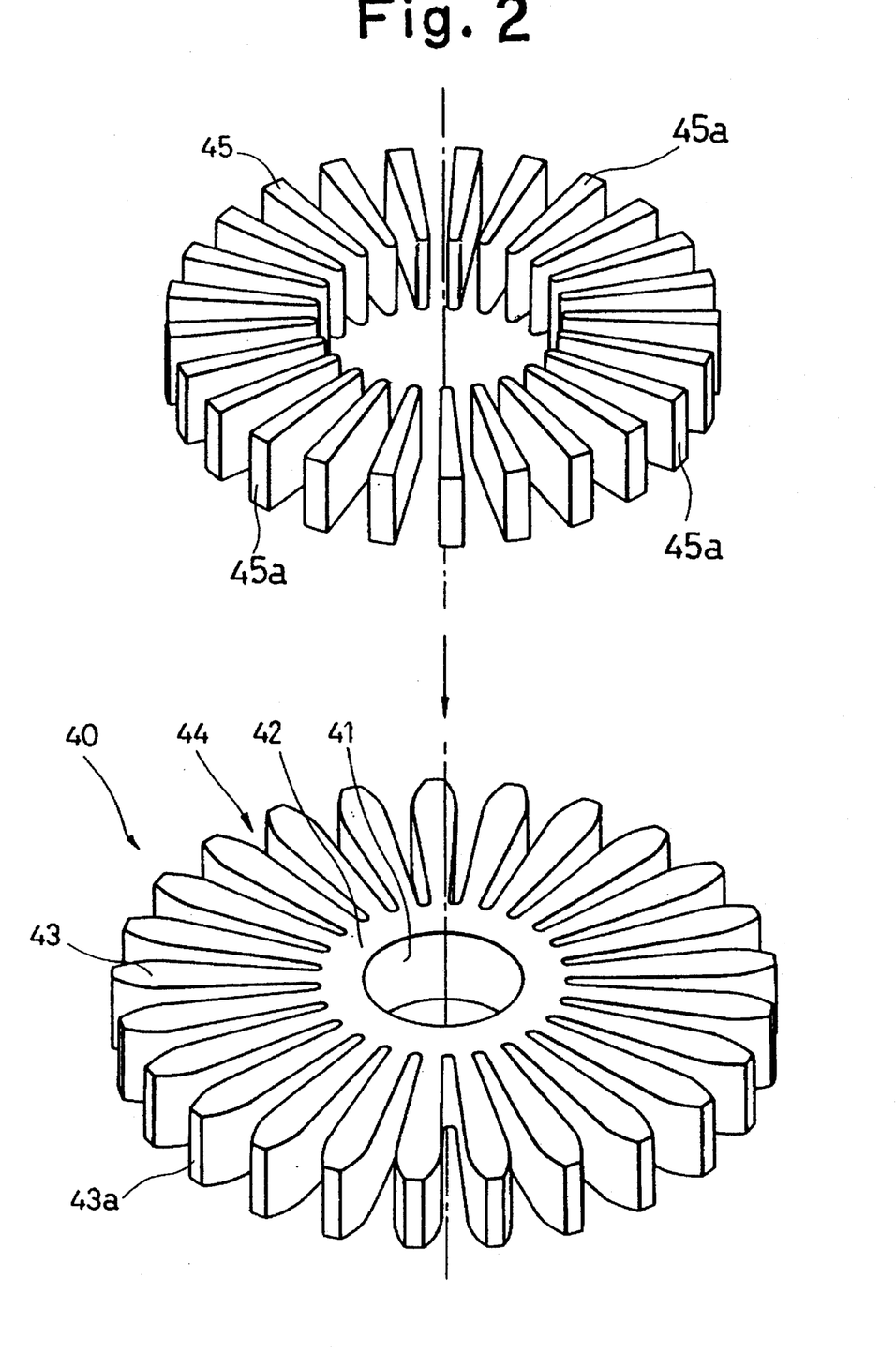
FIG. 2 is an exploded perspective view of an oscillation damping gear shown in FIG. 1.

FIGS. 1 and 2 show a first embodiment of the damping gear G1 according to a first aspect of the invention. The camping gear G1 is comprised of a gear portion (gear teeth) 40 which is substantially in the form of a chrysanthemum and an oscillation damping member 45. The gear portion 40 is made of a resilient or flexible material, such as steel, copper, aluminium, or synthetic resin. The gear portion 40 is provided with a bearing portion 42 having at the center thereof an axial through hole 41, and a plurality of radial legs 43 extending in the radial directions from the bearing portion 42. There are radial grooves 44 defined between the adjacent radial legs 43. The front ends of the radial legs 43 constitute the teeth 43a of the damping gear G1. With this arrangement, the radial legs 43 are elastically deformable in the circumferential direction of the damping gear G1, about the root or base portions of the radial legs connected to the bearing portion 42.

Oscillation damping member 45 includes a plurality of separate damping plates 45a (petals) and has the same thickness (height) as that of the gear portion 40. The damping plates 45a are fitted in the respective grooves 44 defined between the adjacent legs 43 of the gear portion 40 to be made integral therewith. The inner ends of the damping plates 45a substantially reach the bottoms of the radial grooves 44. The damping member 45 is made of a material which exhibits a good damping property, such as silicone gel, butyl rubber (IIR), urethane rubber of highly damping capability, natural rubber, etc. Among these materials, silicone gel is most preferable, since it is thermally stable.

Figure 5:
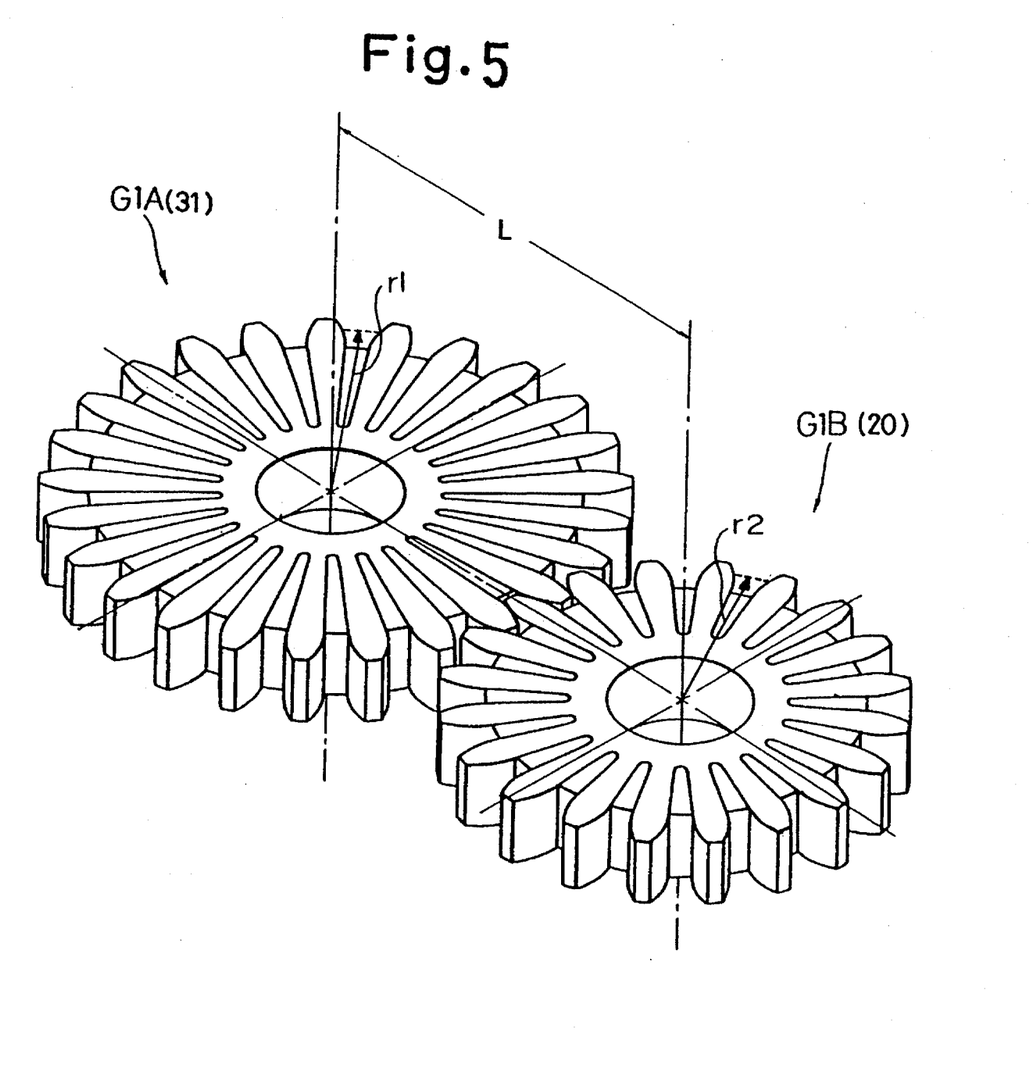
FIG. 5 is a perspective view of a pair of oscillation damping gears shown in FIGS. 1 and 2, which are in mesh with each other.

The gears 17, 18, 20, 21, 22 and 31 through 34 are each engaged by a mating gear, as shown in FIG. 5. In FIG. 5, the first damping gear G1A, e.g., gear 31, is in mesh with the second damping gear G1B, e.g., gear 20, by way of example. The distance L between the axes of the first and second damping gears G1A and G1B, 31 and 20, is set such that there is no backlash therebetween. The distance L meets the requirement defined by the following formula:

$$L \leq r1 + r2,$$

wherein "r1" designates the pitch radius of the gear 31 (G1A); and, "r2" the pitch radius of the gear 20 (G1B).

In view of an absence of backlash, the distance L is preferably smaller than (r1+r2), i.e., L<r1+r2.

The film winding and rewinding mechanism 10 of a camera, as constructed above according to the present invention operates as follows.

Upon winding, the DC motor 15 rotates the pinion 16 in the clockwise direction "A" in FIG. 11, so that the clutch lever 19 is rotated in the clockwise direction through the gears 17 and 18. Consequently, the clutch gear 20 is in mesh with the gear 21 in the first position indicated by a solid line in FIG. 11. Hence, the rotation of the DC motor 15 is transmitted to the winding spool 11 through the pinion 16, the gears 17 and 18, the clutch gear 20, the gears 21 and 22, and the gear portion 11a. Consequently, the winding spool 11 is rotated in the clockwise direction to wind the film.

Upon rewinding, the DC motor 15 rotates the pinion 16 in the counterclockwise direction in FIG. 11, so that the clutch lever 19 is rotated in the counterclockwise direction through the pinion 16, and the gears 17 and 18. Consequently, the clutch gear 20 is moved to the second position indicated by a phantom line in FIG. 11, in which the clutch gear 20 is in mesh with the gear 31. Thus, the rotation of the DC motor 15 is transmitted to the rotating member 13 through the pinion 16, the gears 17 and 18, the clutch gear 20, and the gear train 30. As a result, the winding spool 11 is rotated in the counterclockwise direction to rewind the film.

During the winding and rewinding operations as mentioned above, there is no backlash between the mating gears 17, 18, 20, 21, 22 and 31 through 34. Nevertheless, a smooth rotation of each gear is ensured owing to an elastic deformation of the radial legs 43 of each gear portion 40 in the circumferential direction of the associated gear. The radial legs 43 are automatically returned to the initial position due to the elastic restoring force thereof when the gears are disengaged from the mating gears. During the restoration of the legs 43 to the initial position, the legs 43 oscillate. However, the oscillation is absorbed by the adjacent damping plates 45a of the damping member 45. Therefore, there is substantially no noise due to the gears during the film winding and rewinding operations.

Figure 3:
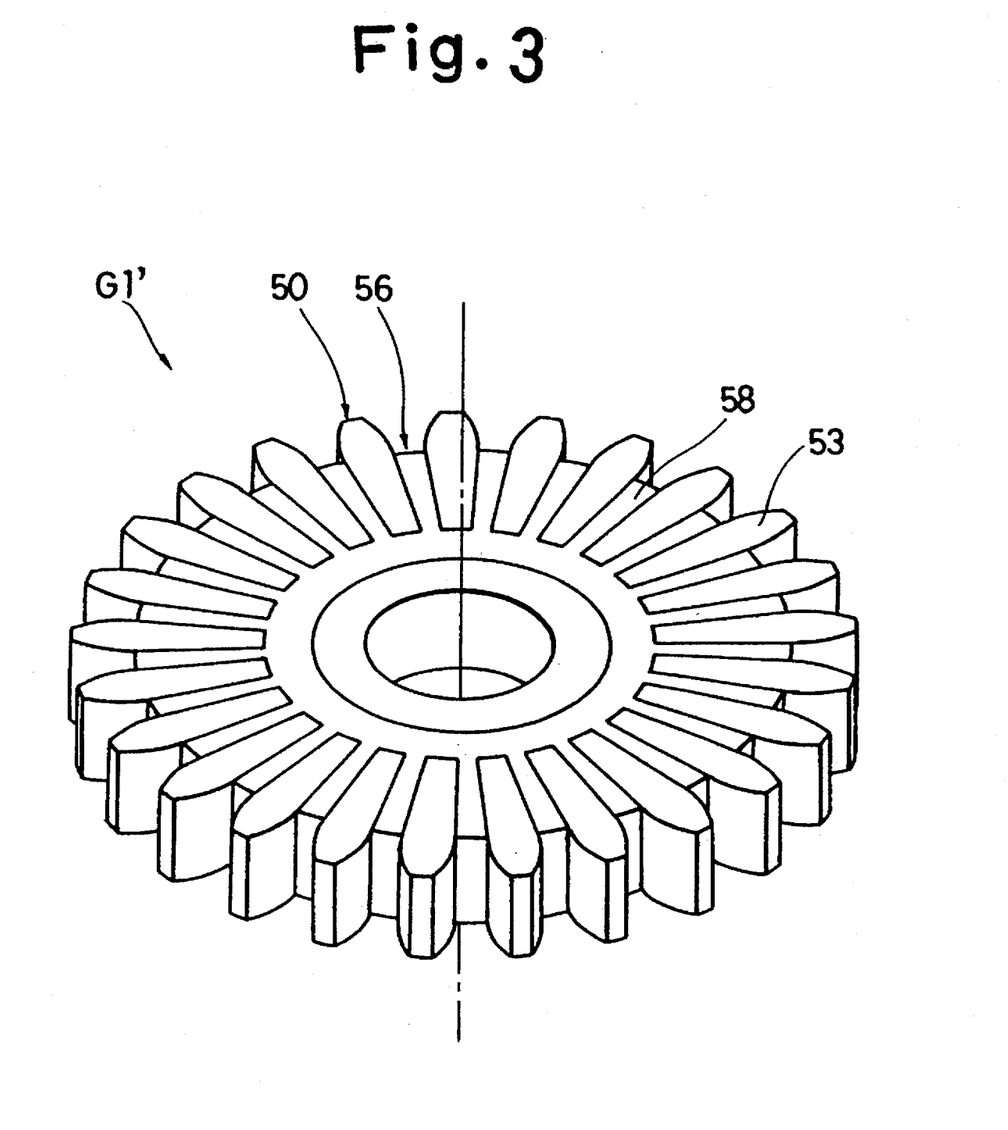
FIG. 3 is a perspective view of a modified embodiment of an oscillation damping gear shown in FIG. 1.
Figure 4:
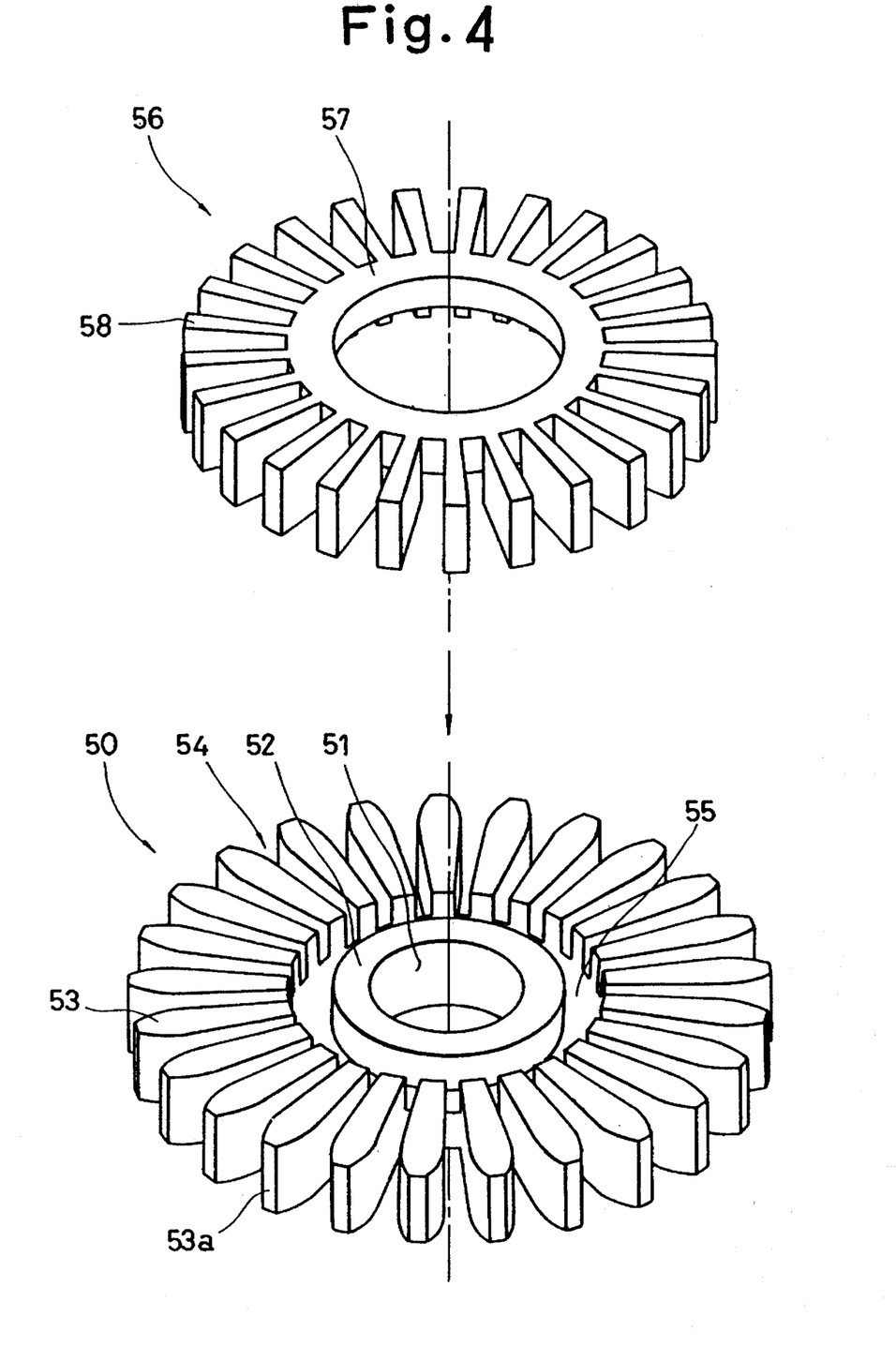
FIG. 4 is an exploded perspective view of an oscillation damping gear shown in FIG. 3.

FIG. 3 shows an alternative damping gear G1' which can be used in place of the damping gear G1 shown in FIG. 1, for the gears 17, 18, 20, 21, 22, 31 through 34. In FIG. 3, the damping member 56 (which corresponds to member 45 of FIG. 2) is formed as an integral assembly in the form of a chrysanthemum. Namely, the damping gear G1' comprises a gear member 50 in the form of a chrysanthemum and a damping member 56 also in the form of a chrysanthemum. As can be seen in FIG. 4 which shows an exploded perspective view of the damping gear G1', the gear portion 50 comprises a bearing portion 52 having a central through hole 51, and a plurality of radial legs 53 extending from the bearing portion 52. The adjacent radial legs 53 define radial grooves 54 therebetween. The front ends (outer ends) of the radial legs 53 constitute gear teeth 53a of the damping gear G1'. The gear member 50 is provided with an annular groove 55 which surrounds the bearing portion 52.

The damping member 56 comprises a central annular portion 57 and a plurality of damping legs, or plates, 58 extending from the central annular portion 57 in the radial direction. The damping legs 58 correspond to the separate damping plates 45a of the damping member 45 in FIG. 2. The annular portion 57 is shaped such that it can be snugly fitted in the annular groove 55 of the gear member 50. When the annular portion 57 is fitted in the annular groove 55 of the gear member 50, the radial legs 58 of the damping member 56 are fitted in the respective radial grooves 54 of the gear member 50. Damping gear G1' as constructed above has the same technical effect and function as that of damping gear G1. Damping gear G1' can also be more easily manufactured than damping gear G1.

Figure 6:
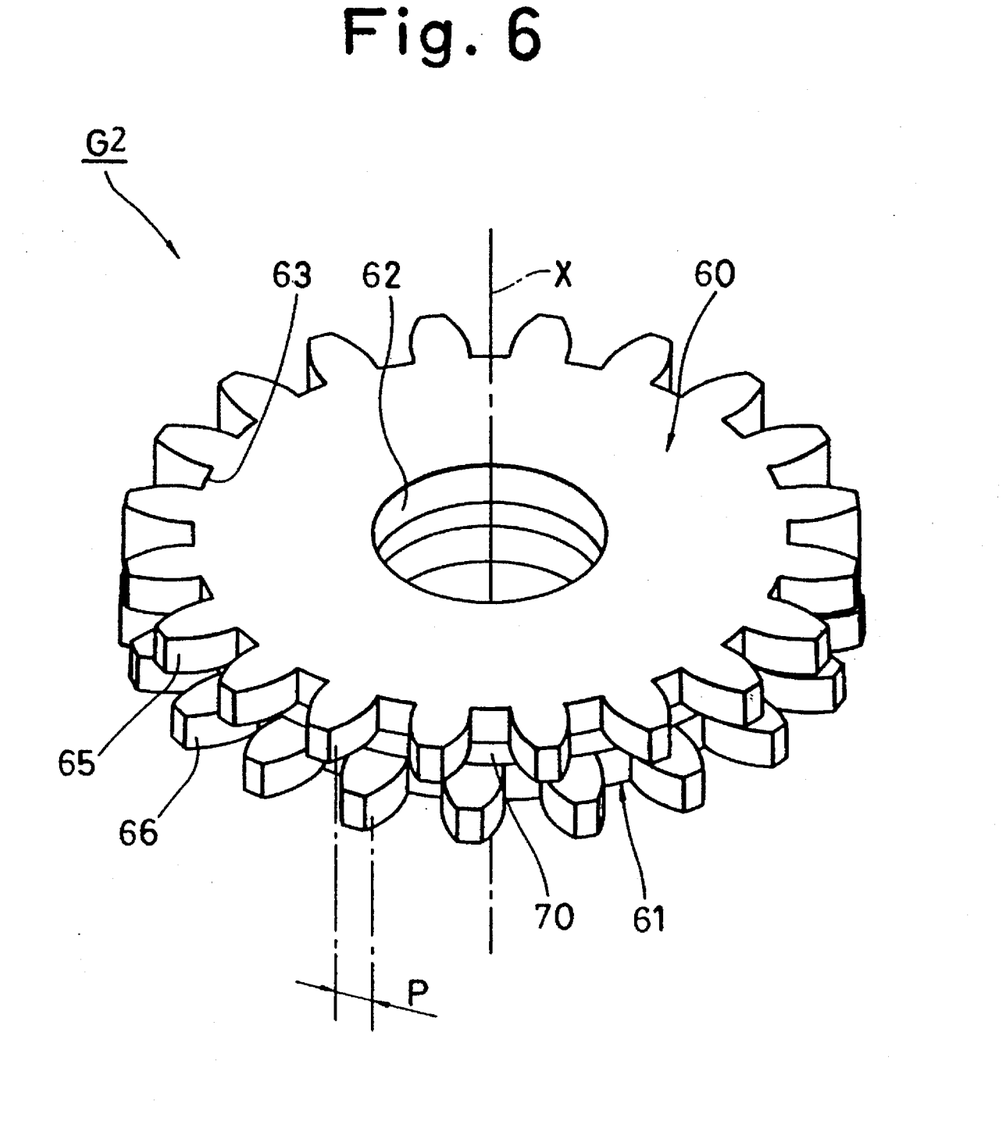
FIG. 6 is a perspective view of an oscillation damping gear according to another embodiment of the present invention.
Figure 7:
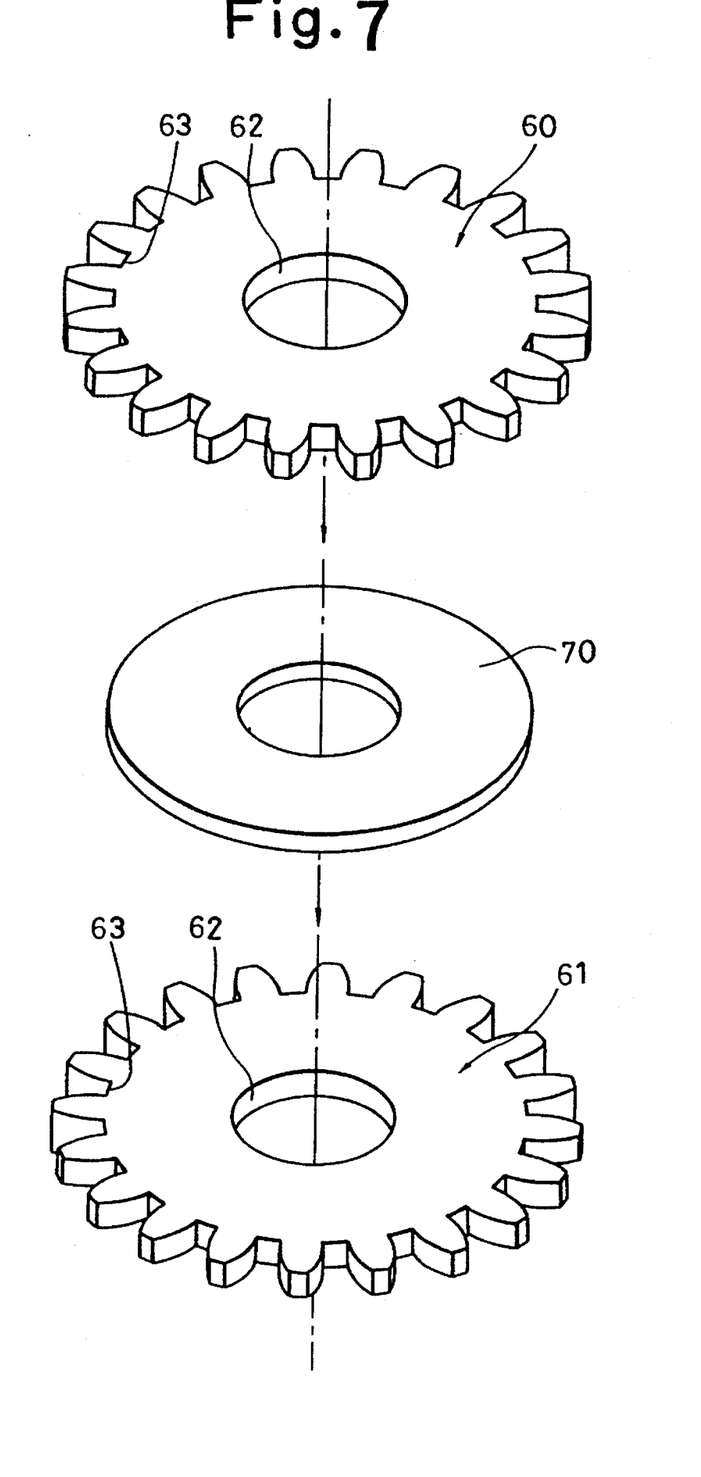
FIG. 7 is an exploded perspective view of an oscillation damping gear shown in FIG. 6.
Figure 8:
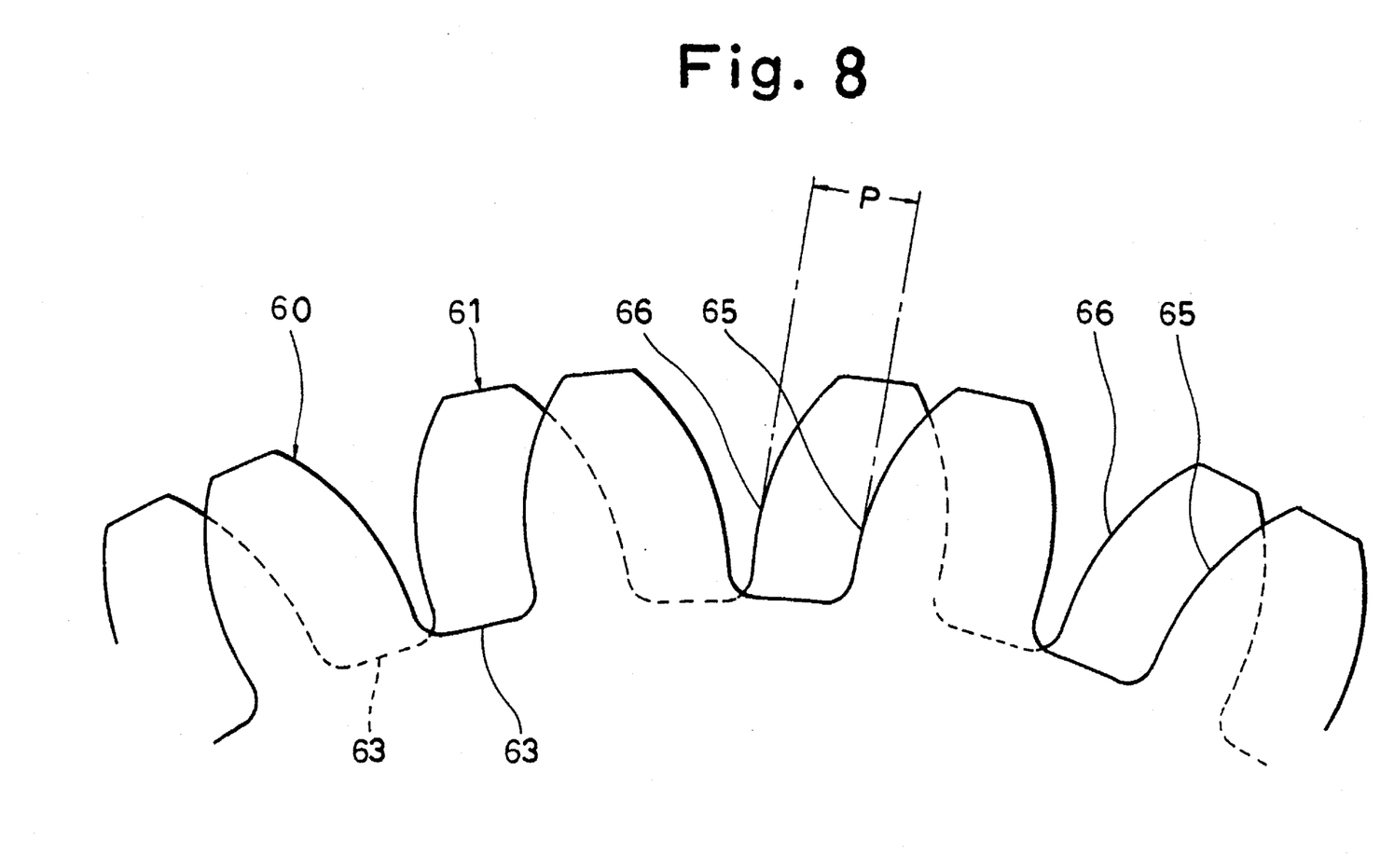
FIG. 8 is an enlarged view of an oscillation damping gear shown in FIG. 6.

FIGS. 6 through 10 show a damping gear according to a second aspect of the present invention. The damping gear G2 includes a pair of identical planar gears 60 and 61 that are coaxially superimposed along an axis X through a damping member, or plate, 70 provided therebetween. The damping plate 70 has a predetermined uniform thickness and adheres to the first and second planar gears 60 and 61 with an adhesive. The damping plate 70 lies between the planar gears 60 and 61 and spreads from the inner peripheral surface of the central through hole, or bearing hole, 62 of the first gear 61 to the root circle, or surface, 63 of the gear 60. As can be seen in FIGS. 6 and 8, the first and second gears 60 and 61 are assembled such that there is a phase difference P in the circumferential direction between the teeth 65 and 66 of the first and second gears 60 and 61.

The damping member 70 is made of a material which exhibits a good damping property, such as silicone gel, butyl rubber (IIR), urethane rubber of high damping capability, natural rubber, etc. Among these materials, silicone gel is most preferable, in view of the thermal stability thereof. In the embodiment illustrated in FIGS. 6, 7 and 8, the damping gear G2 is not applied to gears 18, 21, 31 and 33 which are formed as standard gears.

Figure 9:
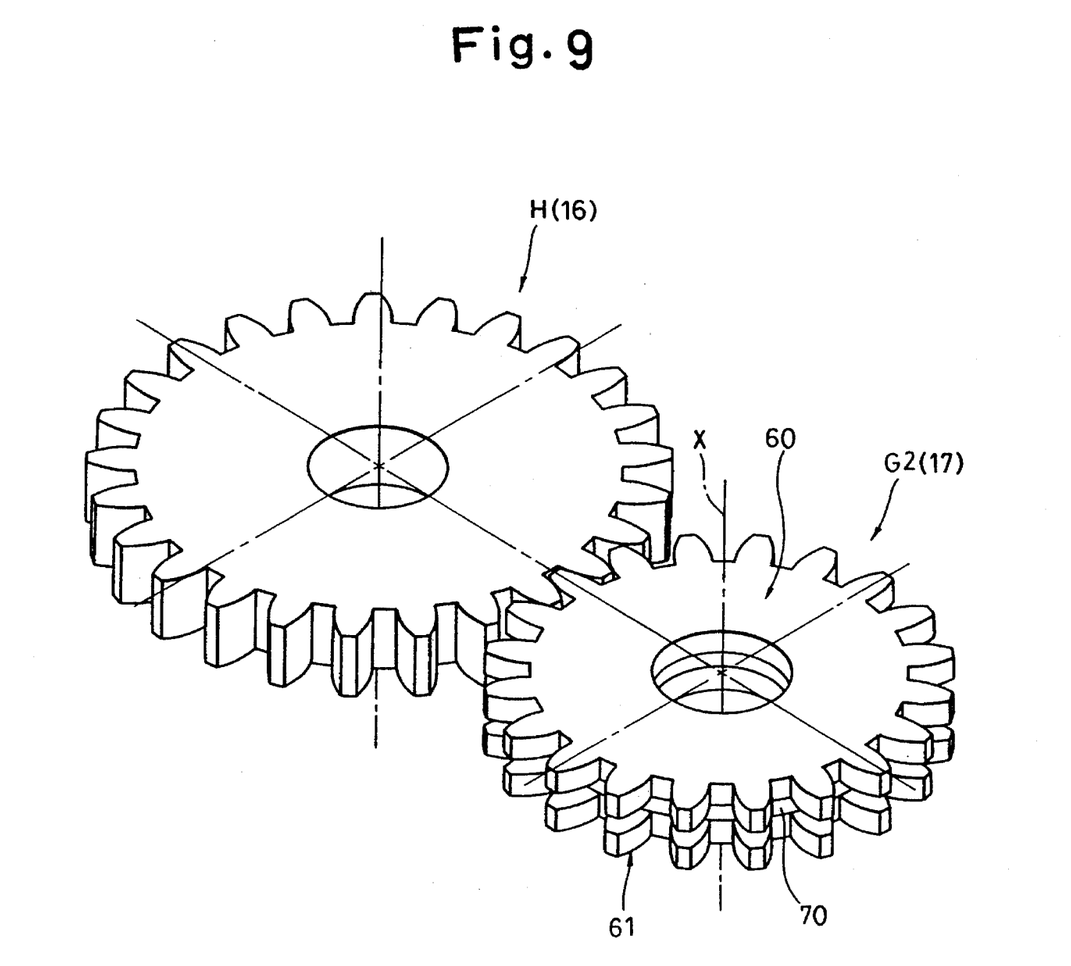
FIG. 9 is an exploded perspective view of a pair of oscillation damping gears shown in FIG. 6, which are in mesh with each other.

The damping gear G2, e.g., gear 17, is in mesh with a gear H, e.g., pinion 16, as shown in FIG. 9 by way of example. Since the teeth 65 and 66 of the planar gears 60 and 61 have a phase difference P therebetween in a free state (FIG. 6), as mentioned above, the damping plate 70 is twisted or rotated about the X axis when the damping gear G2 is engaged by the mating gear H. Consequently, the teeth of the gear H are firmly held between and by the adjacent gear teeth 65 and 66 of the first and second planar gears 60 and 61, owing to the elastic restoring force of the twisted damping member 70. Thus, there is no backlash between the gears G2 and the gear H.

Figure 10:
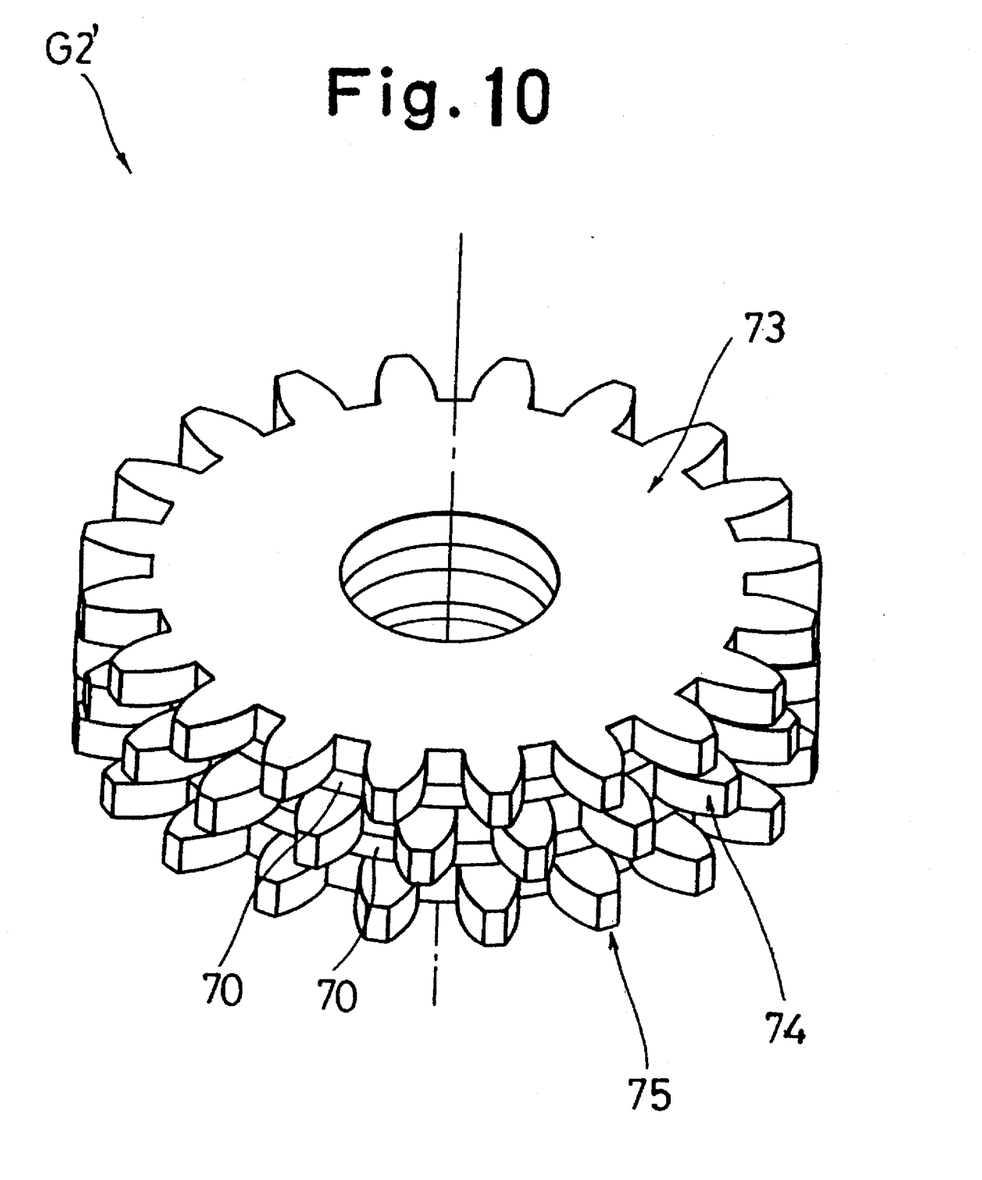
FIG. 10 is a perspective view of a modified embodiment of an oscillation damping gear shown in FIG. 6; and, FIG. 11 is a perspective view of a gear train incorporated in a film winding and rewinding mechanism.

In the embodiment illustrated in FIGS. 6 through 9, the damping gear G2 is formed by the three layers of the two planar gears 60 and 61 and the damping plate 70 therebetween, as discussed above. The three-layered damping gear G2 can be replaced by a multi-layered damping gear G2' having more than three layers, as shown in FIG. 10. In the modified embodiment shown in FIG. 10, the damping gear G2' comprises three identical planar gears 73, 74 and 75, and two damping members, or plates, 70 provided and secured between the adjacent planar gears. The teeth of planar gears 73 and 75 are in phase in the circumferential direction. However, there is a predetermined phase difference, in the circumferential direction between the teeth of planar gear 74 and the teeth of planar gear 73 or 75.

Although the damping gear G1, G1', G2 or G2' is applied to gears 17, 18, 20, 21, 22, and 31 through 34, in the illustrated embodiments, it is possible to form only one or some of the gears 17, 18, 20, 21, 22, and 31 through 34 as damping gears.

The application of the damping gear according to the present invention is not limited to a film winding and rewinding mechanism of a camera, and the present invention can be generally applied to any gear mechanisms.

What is claimed is:

1. An oscillation damping gear comprising:

a gear member, generally in the form of a chrysanthemum, having teeth and radial grooves defined between and by adjacent teeth; and an oscillation damping member comprising a central annular portion, and a plurality of legs extending radially from said central annular portion, said plurality of legs being fitted in said radial grooves of said gear member.

2. The oscillation damping gear according to claim 1, said oscillation damping member is made of silicone gel, butyl rubber (IIR), urethane rubber having a high damping property, or natural rubber.

3. A gear train comprising at least one pair of first and second oscillation damping gears meshing with each other, each pair of said first and second oscillation damping gears comprising:

a gear member, generally in the form of a chrysanthemum, having teeth and radial grooves defined between and by adjacent teeth; and an oscillation damping member comprising a central annular portion, and a plurality of legs extending radially from said central annular portion, said plurality of legs being fitted in said radial grooves of said gear member.

4. The gear train according to claim 3 each said pair of first and second oscillation damping gears satisfying the relationship:

$$L \leq r1 + r2,$$

wherein "r1" designates a pitch radius of said first oscillation damping gear, "r2" designates a pitch radius of said second oscillation damping gear, and "L" designates a distance between an axis of said first oscillation damping gear and an axis of said second oscillation damping gear.

5. The gear train according to claim 3, each said pair of first and second oscillation damping gears satisfy the relationship:

$$L<r1+r2,$$

wherein "r1" designates a pitch radius of said first oscillation damping gear, "r2" designates a pitch radius of said second oscillation damping gear, and "L" designates a distance between an axis of said first oscillation damping gear and an axis of said second oscillation damping gear.

6. A gear train for a camera having a driving motor, a spool and a film rewinding fork, in which a rotation of the driving motor is transmitted to at least one of the spool and the film rewinding fork through the gear train, comprising:

at least one gear of said gear train being an oscillation damping gear, said damping gear comprising a gear member having teeth and radial grooves defined between and by adjacent teeth; and an oscillation damping member comprising a central annular portion, and a plurality of legs extending radially from said central annular portion, said plurality of legs being fitted in said radial grooves of said gear member.

7. The gear train according to claim 6, comprising at least one pair of first and second oscillation damping gears meshing with each other, each said pair of first and second oscillation damping gears comprising a gear member, generally in the form of a chrysanthemum, having teeth and radial grooves defined between and by adjacent teeth, each of said plurality of legs of said oscillation damping elements being fitted in said radial grooves of each said gear member.

8. The gear train according to claim 7, each said pair of first and second oscillation damping gears satisfy the relationship:

$$L<r1+r2,$$

wherein "r1" designates a pitch radius of said first oscillation damping gear, "r2" designates a pitch radius of said second oscillation damping gear, "L" designates a distance between an axis of said first oscillation damping gear and an axis of said second oscillation damping gear.

9. The gear train according to claim 7, each said pair of first and second oscillation damping gears satisfy the relationship:

$$L \leq r1+r2,$$

wherein "r1" designates a pitch radius of said first oscillation damping gear, "r2" designates a pitch radius of said second oscillation damping gear, "L" designates a distance between an axis of said first oscillation damping gear and an axis of said second oscillation damping gear.

10. The gear train according to claim 6 said oscillation damping member is made of silicone gel, butyl rubber (IIR), urethane rubber having a high damping property, or natural rubber.

* * * * *